(12) United States Patent
Yang et al.

(10) Patent No.: US 12,146,074 B2
(45) Date of Patent: Nov. 19, 2024

(54) DISPERSANT AND WATERBORNE EPOXY COATING COMPOSITION

(71) Applicant: Dow Global Technologies LLC, Midland, MI (US)

(72) Inventors: Weijun Yang, Shanghai (CN); Hu Li, Shanghai (CN); Longlan Cui, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 639 days.

(21) Appl. No.: 17/285,150

(22) PCT Filed: Dec. 3, 2018

(86) PCT No.: PCT/CN2018/118894
§ 371 (c)(1),
(2) Date: Apr. 14, 2021

(87) PCT Pub. No.: WO2020/113366
PCT Pub. Date: Jun. 11, 2020

(65) Prior Publication Data
US 2021/0363363 A1   Nov. 25, 2021

(51) Int. Cl.
| | |
|---|---|
| *C08K 3/013* | (2018.01) |
| *C08F 212/08* | (2006.01) |
| *C08F 220/14* | (2006.01) |
| *C08F 220/28* | (2006.01) |
| *C08F 220/56* | (2006.01) |
| *C08F 220/58* | (2006.01) |
| *C08F 230/02* | (2006.01) |
| *C09D 5/08* | (2006.01) |
| *C09D 7/65* | (2018.01) |
| *C09D 163/00* | (2006.01) |

(52) U.S. Cl.
CPC ............ *C09D 7/65* (2018.01); *C08F 212/08* (2013.01); *C08F 220/14* (2013.01); *C08F 220/286* (2020.02); *C08F 220/56* (2013.01); *C08F 220/585* (2020.02); *C08F 230/02* (2013.01); *C08K 3/013* (2018.01); *C09D 5/08* (2013.01); *C09D 163/00* (2013.01)

(58) Field of Classification Search
CPC ............... C08F 230/02; C08F 220/585; C08F 220/286; C09D 5/08; C09D 163/00
See application file for complete search history.

(56) References Cited

U.S. PATENT DOCUMENTS

| | | |
|---|---|---|
| 4,959,428 A | 9/1990 | Abe et al. |
| 5,268,417 A | 12/1993 | Filges et al. |
| 5,278,225 A | 1/1994 | Kohlhammer et al. |
| 5,348,997 A | 9/1994 | Kato et al. |
| 6,733,884 B2 | 5/2004 | Brown |
| 8,816,016 B2 | 8/2014 | Brady |
| 2012/0301621 A1 | 11/2012 | Dombrowski |
| 2014/0018473 A1* | 1/2014 | Ratering ............... C09D 131/04 523/437 |

FOREIGN PATENT DOCUMENTS

| | | |
|---|---|---|
| AU | 2007269038 | 1/2008 |
| CN | 101010366 | 8/2007 |
| CN | 103571256 | 2/2014 |
| CN | 107459602 A | 12/2017 |
| CN | 107459609 | 12/2017 |
| EP | 2495281 A1 | 9/2012 |
| WO | 2016095583 | 6/2016 |
| WO | 2016102794 | 6/2016 |
| WO | 2017214918 | 12/2017 |
| WO | 2018081943 | 5/2018 |

OTHER PUBLICATIONS

Supplementary European Search Report for the corresponding European Patent Application No. 18941961; Date of Mailing: Jun. 17, 2022; 9 pages.

* cited by examiner

*Primary Examiner* — Catherine S Branch
*Assistant Examiner* — Huihong Qiao
(74) *Attorney, Agent, or Firm* — Susan M. Zerull

(57) ABSTRACT

A polymeric dispersant and a stable two-component epoxy coating composition comprising an epoxy component A comprising: a waterborne epoxy resin, the polymeric dispersant, and pigments and/or extenders; and a component B comprising a curing agent; providing coatings made therefrom with improved anti-corrosion properties; and a method of preparing the coating composition.

13 Claims, No Drawings

DISPERSANT AND WATERBORNE EPOXY COATING COMPOSITION

FIELD OF THE INVENTION

The present invention relates to a waterborne epoxy coating composition.

INTRODUCTION

Epoxy coatings are extensively used in construction coatings and protective coatings because of their chemical resistance, corrosion protection and mechanical properties. Waterborne epoxy binders have much less environmental concerns than conventional solvent epoxy resins.

Waterborne epoxy coating compositions are typically formed from two components, a waterborne epoxy component (Component A) and a hardener component (Component B). The two components are mixed prior to application of the coating compositions to prevent coagulation. When pigments and/or extenders are included in waterborne epoxy coating compositions, dispersants are usually used to disperse pigments and/or extenders in Component A. Conventional anionic acrylic polymeric dispersants derived from carboxylic acid monomers can afford sufficient dispersing efficiency for pigments and/or extenders, but usually cause a colloidal stability issue of Component A due to the reaction of acrylic carboxylate groups of the acrylic polymer dispersant with oxirane groups of an epoxy resin. Use of non-ionic dispersants may solve the above described stability issue, but usually requires higher loading to provide comparable dispersing efficiency as compared to anionic acrylic polymeric dispersants, thus negatively impact anti-corrosion properties. Another approach is to disperse pigments and/or extenders into the hardener component of waterborne epoxy coating compositions. For example, US2012/0301621A discloses a coating composition comprising aqueous dispersions of acrylic polymer particles imbibed with epoxy resins in Component A, and pigments and a curing agent added in Component B at a weight ratio of Component A to Component B being about 3:2, but operation difficulties may arise in regard to incorporation of Component B to a similar amount of Component A.

Therefore, it is desirable to provide a novel polymeric dispersant suitable for a stable two-component epoxy coating composition that comprises pigments and/or extenders dispersed in a waterborne epoxy component by the polymeric dispersant, and a hardener component, which provides coatings made therefrom with improved corrosion resistance properties.

SUMMARY OF THE INVENTION

The present invention provides a novel polymeric dispersant that can provide desirable dispersing efficiency for pigments and/or extenders and a two-component epoxy coating composition comprising the polymeric dispersant. The two-component epoxy coating composition comprising an epoxy component A (hereinafter "Component A") comprising a waterborne epoxy resin, the polymeric dispersant, and pigments and/or extenders dispersed therein, and a component B (hereinafter "Component B") comprising a curing agent. Component A and Component B are mixed prior to application of the epoxy coating composition. The epoxy coating composition of the present invention has good storage stability as indicated by viscosity change of 10 Krebs Units (KU) or less after storage. The epoxy coating composition can also provide coatings made therefrom with improved salt spray corrosion resistance as indicated by a blister rating better than "2MD" at a dry film thickness of 50-60 μm after at least 110 hours of exposure to salt spray when coated onto a corrosion susceptible substrate. The dispersing efficiency, storage stability and salt spray test may be measured according the test methods described in the Examples section below.

In a first aspect, the present invention is a polymeric dispersant comprising, by weight based on the dry weight of the polymeric dispersant, (a) from 11% to 60% of structural units of an acid monomer and/or a salt thereof selected from the group consisting of an ethylenically unsaturated sulfonic acid-containing monomer or a salt thereof, an ethylenically unsaturated phosphorous acid-containing monomer or a salt thereof, or mixtures thereof;

(b) from 0.5% to 20% of structural units of a carbonyl-containing functional monomer; and (c) from 20% to 88.5% of structural units of an ethylenically unsaturated nonionic monomer;

wherein the polymeric dispersant has a weight average molecular weight of from 300 to 40,000 Daltons.

In a second aspect, the present invention is a two-component epoxy coating composition comprising: an epoxy component A and a component B comprising a curing agent, wherein the epoxy component A comprises a waterborne epoxy resin, a polymeric dispersant of the first aspect, and pigments and/or extenders.

In a third aspect, the present invention is a method of preparing a two-component epoxy coating composition. The method comprises admixing an epoxy component A and a component B comprising a curing agent, wherein the epoxy component A comprises a waterborne epoxy resin, a polymeric dispersant of the first aspect, and pigments and/or extenders.

DETAILED DESCRIPTION OF THE INVENTION

"Aqueous" composition or dispersion herein means that particles dispersed in an aqueous medium. By "aqueous medium" herein is meant water and from zero to 30%, by weight based on the weight of the medium, of water-miscible compound(s) such as, for example, alcohols, glycols, glycol ethers, glycol esters, and the like.

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

As used herein, the term structural units, also known as polymerized units, of the named monomer refers to the remnant of the monomer after polymerization. For example, a structural unit of methyl methacrylate is as illustrated:

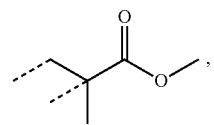

where the dotted lines represent the points of attachment of the structural unit to the polymer backbone.

The polymeric dispersant of the present invention comprises structural units of one or more acid monomers and/or salts thereof. The acid monomers and/or salts thereof are selected from the group consisting of an ethylenically unsaturated sulfonic acid-containing monomer, an ethylenically unsaturated phosphorous acid-containing monomer, salts thereof, or combinations thereof.

The ethylenically unsaturated sulfonic acid-containing monomer and/or salt thereof useful in the present invention may include sodium styrene sulfonate (SSS), sodium vinyl sulfonate (SVS), 2-acrylamido-2-methylpropanesulfonic acid (AMPS), salts of the ethylenically unsaturated sulfonic acid-containing monomer such as sodium 2-acrylamido-2-methylpropane sulfonate, or mixtures thereof. The polymeric dispersant may comprise, by weight based on the dry weight of the polymeric dispersant, zero or more, 5% or more, 6% or more, 7% or more, 8% or more, 9% or more, or even 10% or more, and at the same time, 60% or less, 50% or less, 40% or less, 30% or less, 25% or less, 20% or less, or even 15% or less of structural units of the ethylenically unsaturated sulfonic acid-containing monomers and/or salt thereof.

The ethylenically unsaturated phosphorous acid-containing monomer and/or salt thereof useful in the present invention can be dihydrogen phosphate esters of an alcohol in which the alcohol contains or is substituted with a polymerizable vinyl or olefinic group. Suitable ethylenically unsaturated phosphorous acid-containing monomers and salts thereof may include, for example, phosphoalkyl (meth)acrylates such as phosphoethyl (meth)acrylate, phosphopropyl (meth)acrylate, phosphobutyl (meth)acrylate, salts of phosphoalkyl (meth)acrylates, and mixtures thereof; $CH_2=C(R)-C(O)-O-(R_pO)_n-P(O)(OH)_2$, wherein R=H or $CH_3$ and $R_p$=alkyl, n is from 1 to 20, such as SIPOMER PAM-100, SIPOMER PAM-200, SIPOMER PAM-300, and SIPOMER PAM-4000 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, allyl ether phosphate, salts thereof, or mixtures thereof. Preferred ethylenically unsaturated phosphorous acid-containing monomers and salts thereof are selected from the group consisting of phosphoethyl (meth)acrylate, phosphopropyl (meth)acrylate, phosphobutyl (meth)acrylate, salts thereof, and mixtures thereof; more preferably, phosphoethyl methacrylate (PEM). The polymeric dispersant may comprise, by weight based on the dry weight of the polymeric dispersant, 1.5% or more, 2% or more, 3% or more, 4% or more, or even 5% or more, and at the same time, 60% or less, 50% or less, 40% or less, 30% or less, 20% or less, or even 15% or less of structural units of the ethylenically unsaturated phosphorous-containing monomer and/or salt thereof.

The polymeric dispersant of the present invention may comprise, by weight based on the dry weight of the polymeric dispersant, the structural units of the acid monomer and/or salts thereof in a combined amount of 11% or more, 12% or more, 15% or more, 18% or more, or even 20% or more, and at the same time, 60% or less, 55% or less, 50% or less, 45% or less, 40% or less, 35% or less, 33% or less, 30% or less, or even 28% or less. Preferably, the polymeric dispersant comprises a combination of the structural units of the ethylenically unsaturated sulfonic acid-containing monomer and/or salt thereof with structural units of the ethylenically unsaturated phosphorous-acid containing monomer and/or salt thereof; and preferably at a weight ratio of 0.3 or higher, 0.35 or higher, 0.4 or higher, 0.45 or higher, 0.5 or higher, 0.55 or higher, 0.6 or higher, or even 0.65 or higher, and at the same time, 20.0 or less, 18.0 or less, 15.0 or less, 12.0 or less, 10.0 or less, 7.5 or less, 6.0 or less, 5.0 or less, 4.0 or less, 3.5 or less, or even 3.0 or less. "Weight ratio" herein refers to the weight ratio of the structural units of the ethylenically unsaturated sulfonic acid-containing monomer and/or salt thereof to the structural units of the ethylenically unsaturated phosphorous acid-containing monomer and/or salt thereof.

The polymeric dispersant of the present invention may also comprise structural units of one or more carbonyl-containing functional monomers. Examples of suitable carbonyl-containing functional monomers include diacetone methacrylamide, diacetone acrylamide (DAAM), acetoacetoxy or acetoacetamide functional monomers including, for example, acetoacetoxyethyl (meth)acrylate such as acetoacetoxyethyl methacrylate (AAEM), acetoacetoxypropyl (meth)acrylate, acetoacetoxybutyl (meth)acrylate, 2,3-di(acetoacetamido)propyl(meth)acrylate, 2,3-di(acetoacetoxy) propyl (meth)acrylate, acetoacetamidoethyl(meth)acrylate, acetoacetamidopropyl(meth)acrylate, allyl acetoacetates, acetoactamidobutyl(meth)acrylate, vinyl acetoacetates, and acetoacetamides; or mixtures thereof. Preferred carbonyl-containing functional monomer is diacetone acrylamide. The polymeric dispersant may comprise, by weight based on the dry weight of the polymeric dispersant, 0.5% or more, 1% or more, 1.5% or more, 2% or more, 2.5% or more, 3% or more, 3.5% or more, 4% or more, 4.5% or more, 5% or more, 5.5% or more, 6% or more, 6.5% or more, 7% or more, or even 8% or more, and at the same time, 20% or less, 18% or less, 15% or less, 12% or less, or even 10% or less of structural units of the carbonyl-containing functional monomer.

The polymeric dispersant of the present invention may also comprise structural units of one or more ethylenically unsaturated nonionic monomers. The term "nonionic monomers" herein refers to monomers that do not bear an ionic charge between pH=1-14. Suitable examples of the ethylenically unsaturated nonionic monomers include, for example, alkyl esters of (meth)acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, (meth)acrylonitrile; hydroxy-functional alkyl (meth)acrylates; alkoxylated (meth)acrylates; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride and vinylidene chloride; or combinations thereof. Suitable hydroxy-functional alkyl (meth)acrylates may include hydroxyethyl (meth)acrylate such as 2-hydroxyethyl acrylate and 2-hydroxyethyl methacrylate; hydroxypropyl (meth)acrylate such as 2-hydroxypropylacrylate, 2-hydroxypropyl methacrylate, 3-hydroxypropyl acrylate, and 3-hydroxypropyl methacrylate; hydroxybutyl (meth)acrylates such as 3-hydroxybutyl acrylate, 3-hydroxybutyl methacrylate, 4-hydroxybutyl acrylate, and 4-hydroxybutyl methacrylate; 6-hydroxyhexyl acrylate; 6-hydroxyhexylmethacrylate; 3-hydroxy-2-ethylhexyl acrylate; 3-hydroxy-2-ethylhexyl methacrylate; or mixtures thereof. The alkoxylated (meth)acrylate may comprise ethylene oxide ($-CH_2CH_2O-$) units, propylene oxide ($-CH(CH_3)CH_2O-$) units, butylene oxide ($-C(CH_3)_2CH_2O-$) units, or combinations thereof. These units may alternate or may be present in the form of polyethylene oxide, polypropylene oxide, and/or polybutylene oxide blocks. The alkoxylated (meth)acrylate may comprise from 4 to 50, from 5 to 45, from 6 to 40, from 8 to 35, from 9 to 30, or from 10 to 25 of the ethylene oxide units. Suitable commercially available alkoxylated (meth)acrylates include Bisomer S10W (methoxy polyethylene glycol 1000 methacrylate) available from GEO Specialty Chemicals UK Ltd. Preferred ethylenically unsaturated nonionic monomers are ethyl acrylate, 2-hydroxyethyl methacrylate, 2-hydroxypropylacrylate, butyl acrylate, butyl methacrylate, methyl methacrylate, 2-ethylhexyl acrylate, decyl acrylate, lauryl acrylate, isodecyl methacrylate, lauryl methacrylate, styrene, methoxy polyethylene glycol methacrylate, or mixtures thereof. The polymeric dispersant may comprise, by weight based on the dry weight of the polymeric dispersant, 25% or more, 30% or more, 35% or more, 40% or more, 45% or more, 50% or more, 55% or more, or even 60% or more, and at the same time, 88.5% or less, 85% or less, 82% or less, 80% or less, 75% or less, 70% or less, or even 65% or less of structural units of the ethylenically unsaturated nonionic monomer.

The polymeric dispersant of the present invention may optionally comprise structural units of one or more additional α,β-ethylenically unsaturated carboxylic acid monomers. Examples of suitable α,β-ethylenically unsaturated carboxylic acid monomers include monobasic acids such as acrylic, methacrylic, crotonic, and acyloxypropionic acids; and dibasic acid monomers such as maleic, fumaric, and itaconic acids; or mixtures thereof. The polymeric dispersant may comprise, by weight based on the dry weight of the polymeric dispersant, less than 10% of structural units of the additional α,β-ethylenically unsaturated carboxylic acid monomer, for example, less than 9%, less than 8%, less than 5%, less than 4%, less than 3%, less than 2%, less than 1%, less than 0.5%, less than 0.1%, or even zero of structural units of the additional α,β-ethylenically unsaturated carboxylic acid monomer.

In some embodiments, the polymeric dispersant comprises, by weight based on the dry weight of the polymeric dispersant, from 5% to 20% of structural units of the ethylenically unsaturated sulfonic acid-containing monomer and/or salt thereof such as SSS, SVS, AMPS, salts thereof, or mixtures thereof; from 4% to 20% of structural units of the ethylenically unsaturated phosphorous acid-containing monomer and/or salt thereof such as PEM; from 4% to 15% of structural units of diacetone acrylamide, from 55% to 85% of structural units of the ethylenically unsaturated nonionic monomer such as ethyl acrylate, 2-hydroxyethyl methacrylate, 2-hydroxypropylacrylate, butyl acrylate, butyl methacrylate, methyl methacrylate, 2-ethylhexyl acrylate, decyl acrylate, lauryl acrylate, isodecyl methacrylate, lauryl methacrylate, styrene, methoxy polyethylene glycol methacrylate, or mixtures thereof; and optionally from zero to 5% of structural units of the additional α,β-ethylenically unsaturated carboxylic acid monomer such as acrylic acid, methacrylic acid, maleic acid, fumaric acid, itaconic acid, or mixtures thereof. In some further embodiments, the polymeric dispersant comprises, by weight based on the dry weight of the polymeric dispersant, from 10% to 20% of structural units of the ethylenically unsaturated sulfonic acid-containing monomer and/or salt thereof; from 5% to 15% of structural units of the ethylenically unsaturated phosphorous acid-containing monomer and/or salt thereof; from 4% to 15% of structural units of diacetone acrylamide, from 55% to 80% of structural units of the ethylenically unsaturated nonionic monomer; and optionally from zero to 5% of structural units of the additional α,β-ethylenically unsaturated carboxylic acid monomer.

In some other embodiments, the polymeric dispersant comprises, by weight based on the dry weight of the polymeric dispersant, from 15% to 60% of structural units of the ethylenically unsaturated phosphorous acid-containing monomer and/or salt thereof such as PEM, from 2% to 15% of structural units of diacetone acrylamide, from 25% to 80% of structural units of the alkoxylated (meth)acrylate, the hydroxy-functional alkyl (meth)acrylate, or combinations thereof, including, for example, methoxy polyethylene glycol methacrylate, 2-hydroxyethyl methacrylate, 2-hydroxypropylacrylate, or mixtures thereof. In some further embodiments, the polymeric dispersant comprises, by weight based on the dry weight of the polymeric dispersant, from 20% to 50% of structural units of the ethylenically unsaturated phosphorous acid-containing monomer and/or salt thereof, from 2% to 15% of structural units of diacetone acrylamide, and from 30% to 75% of structural units of the alkoxylated (meth)acrylate, the hydroxy-functional alkyl (meth)acrylate, or combinations thereof, and optionally from zero to 5% by weight of structural units of the additional α,β-ethylenically unsaturated carboxylic acid monomer.

The polymeric dispersant of the present invention may have a weight average molecular weight of from 300 to 40,000 daltons, for example, 500 daltons or more, 800 daltons or more, 1,000 daltons or more, 1,500 daltons or more, 2,000 daltons or more, 2,500 daltons or more, 3,000 daltons or more, 3,500 daltons or more, 4,000 daltons or more, 4,500 daltons or more, 5,000 daltons or more, 5,500 daltons or more, or even 6,000 daltons or more, and at the same time, 38,000 daltons or less, 35,000 daltons or less, 32,000 daltons or less, 30,000 daltons or less, 28,000 daltons or less, 25,000 daltons or less, 24,000 daltons or less, 22,000 daltons or less, 21,000 daltons or less, 20,000 daltons or less, 19,000 daltons or less, 18,000 daltons or less, 17,000 daltons or less, 16,000 daltons or less, 15,000 daltons or less, 14,000 daltons or less, 13,000 daltons or less, 12,000 daltons or less, or even 10,000 daltons or less. The weight average molecular weight herein is measured by Gel Permeation Chromatography (GPC) according to the test method described in the Examples section below.

The polymeric dispersant of the present invention may be prepared by free-radical polymerization of the monomers described above, for example, aqueous solution polymerization or emulsion polymerization. Dosage of each monomer, based on the total weight of monomers, is substantially the same as dosage of structural units of such monomer based on the dry weight of the polymeric dispersant. Total weight concentration of monomers for preparing the polymeric dispersant is equal to 100%. A mixture of monomers for preparing the polymeric dispersant, may be added as a monomer solution in water or as an emulsion in water; or added in one or more additions or continuously, linearly or nonlinearly, over the reaction period of preparing the polymeric dispersant. Temperature suitable for the polymerization process may be lower than 100° C., for example, in the range of from 30 to 99° C. or in the range of from 50 to 97° C. Multistage free-radical polymerization using the monomers described above can be used, which at least two stages are formed sequentially, and usually results in the formation of the multistage polymer comprising at least two polymer compositions.

In the polymerization process for preparing the polymeric dispersant, free radical initiators may be used. The polymerization process may be thermally initiated or redox initiated aqueous solution polymerization or emulsion polymerization. Examples of suitable free radical initiators include hydrogen peroxide, tert-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of from 0.01% to 15%, from 0.01% to 5%, or from 0.01% to 3%, by weight based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process for preparing the polymeric dispersant, one or more surfactants may be used. The surfactants may be added prior to or during the polymerization of the monomers, or combinations thereof. A portion of the surfactant can also be added after the polymerization. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The surfactant may be used in an amount of from zero to 10%, preferably from 0.05% to 3%, by weight based on the weight of total monomers used for preparing the polymeric dispersant.

In the polymerization process for preparing the polymeric dispersant, a chain transfer agent may be used. Examples of suitable chain transfer agents used in emulsion polymerization include n-dodecylmercaptan (nDDM), and 3-mercaptopropionic acid, methyl 3-mercaptopropionate (MMP), butyl 3-mercaptopropionate (BMP), benzenethiol, azelaic alkyl mercaptan, or mixtures thereof. Example of suitable chain transfer agents used in aqueous solution polymerization include sodium hyphophosphite, phosphorous acid, sodium metabisulfite, sodium bisulfite, or mixtures thereof. The chain transfer agent may be used in an effective amount to control the molecular weight of the polymeric dispersant. Preferably, the chain transfer agent is used in an amount of 0.001% or more, 0.01% or more, or even 0.1% or more, or even 1% or more, and at the same time, 20% or less, 15% or less, 10% or less, or even 5% or less by weight based on the total weight of monomers used for preparing the polymeric dispersant.

The obtained polymeric dispersant of the present invention may have a pH value of from 0.5 to 5.0, from 1.0 to 4.5, or from 1.5 to 4.0. The polymeric dispersant may have a viscosity of from 0 to 100 centipoises (cP), from 0 to 80 cP, or from 0 to 60 cP, as measured by $2^{\#}$ spindle of Brookfield viscosity meter at 60 rpm.

The polymeric dispersant of the present invention may become water-soluble or partially water-soluble upon neutralization. Neutralization can be conducted by adding one or more bases into the polymeric dispersant. Examples of suitable bases include ammonia; alkali metal or alkaline earth metal compounds such as sodium hydroxide, potassium hydroxide, calcium hydroxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The polymeric dispersant of the present invention may have a weight average particle size of from 50 nanometers (nm) to 300 nm, from 80 nm to 200 nm, or from 90 nm to 150 nm. The particle size herein refers to Z-average size and may be measured by a Brookhaven BI-90 Plus Particle Size Analyzer.

The polymeric dispersant of the present invention can provide better dispersing efficiency for pigments and/or extenders as compared to polymeric dispersants free of structural units of the carbonyl-containing functional monomer. The polymeric dispersant of the present invention is useful in many applications such as use in aqueous coating compositions. The aqueous coating composition may further comprise one or more polyfunctional carboxylic hydrazides containing at least two hydrazide groups per molecule. The polyfunctional carboxylic hydrazides may be selected from adipic dihydrazide, oxalic dihydrazide, isophthalic dihydrazide, polyacrylic polyhydrazide, or mixtures thereof. The aqueous coating composition may comprise the polyfunctional carboxylic hydrazide in an amount of from zero to 16%, from 0.5% to 10%, or from 1% to 8%, or from 1.5% to 6%, by weight based on the dry weight of the polymeric dispersant.

The polymeric dispersant of the present invention is particularly suitable for a two-component epoxy coating composition, preferably a waterborne epoxy coating composition. The epoxy coating composition of the present invention is formed from two components—Component A and Component B. Component A can be a binder phase and comprises a waterborne epoxy resin, the polymeric dispersant, and pigments and/or extenders, in which the pigments and/or extenders are preferably dispersed in Component A by the polymeric dispersant. Component B is a hardener phase and comprises a hardener (i.e., curing agent), e.g., an amine curing agent. The polymeric dispersant may be present, by dry weight based on the total dry weight of pigments and/or extenders in Component A, 0.1% or more, 0.15% or more, 0.2% or more, or even 0.3% or more, and at the same time, 10% or less, 5% or less, 3% or less, or even 1% or less.

Component A of the epoxy coating composition of the present invention further comprises one or more waterborne epoxy resins. The waterborne epoxy resin useful in the present invention can be a water-based epoxy resin and dispersed/emulsified in water. The waterborne epoxy resin can be any conventional, water-dispersible epoxy resins. The waterborne epoxy resin can be a self-emulsified epoxy resin, or an emulsion or a dispersion of one or more epoxy compounds and a surfactant (e.g., a nonionic or ionic surfactant) used for emulsifying the epoxy compounds. The self-emulsified epoxy resin may be mixed with water to form an aqueous dispersion. The self-emulsified epoxy resin can be an adduct of an epoxy compound with a hydrophilic monomer or polymer containing at least one group selected from carboxyl, hydroxyl, sulfonate group, ethylene oxide group or amino group. The epoxy compound can be a di-, tri- or tetraglycidyl ether or a di-, or tri- or tetraglycidyl ester. Examples of suitable epoxy compounds include diglycidyl ether of bisphenol A, diglycidyl ether of bisphenol F, 1,4-butanediol diglycidyl ether, 1,6-hexanediol diglycidyl ether, diglycidyl ester of phthalic acid, 1,4-cyclohexanedmethanol diglycidyl ether, 1,3-cyclohexanedmethanol diglycidyl ether, diglycidyl ester of hexahydrophthalic acid, epoxy novolac resins, or mixtures thereof. Two or more waterborne epoxy resins can be used as a mixture. Commercially available aqueous epoxy dispersions include OUDRASPERSE WB-6001 available from Olin Corporation or BECKOPOX EP 387w/52WA available from Allnex, or mixtures thereof.

In some embodiments, the waterborne epoxy resin can be an aqueous dispersion of acrylic polymer particles imbibed with an epoxy compound (herein "epoxy imbibed latex". The epoxy compound include those described above. The acrylic polymer particles in the epoxy imbibed latex are characterized by having a sufficient concentration of anti-agglomerating functional groups to stabilize the epoxy imbibed latex against agglomeration. The imbibed waterborne epoxy is as described in US2012/0301621A. A commercially available epoxy imbibed latexes is MAINCOTE™ AEH-20 available from The Dow Chemical Company (MAINCOTE is a trademark of The Dow Chemical Company).

The aqueous dispersion of acrylic polymer particles in the epoxy imbibed latex can be achieved through free radical emulsion or suspension addition polymerization or by dispersion of a preformed polymer under shear into an aqueous medium. The acrylic polymer herein refers to a polymer comprising structural units of one or more acrylic monomers. Preferably, an acrylic latex or a styrene-acrylic latex is used.

The acrylic polymer in the epoxy imbibed latex may contain anti-agglomerating functional groups, which refer to hydrophilic groups that are sufficiently unreactive with the oxirane groups in the epoxy resin. The anti-agglomerating functional groups in the acrylic polymer particles can be incorporated into the acrylic polymer particles using monomers containing anti-agglomerating functional groups (anti-agglomerating monomers). The anti-agglomerating functional groups are generally selected from amide groups, acetoacetoxy groups, strong protic acids which are pH adjusted to form their conjugate bases, or a combination thereof. Examples of suitable anti-agglomerating functional groups include functional groups of acrylamide; methyl acrylamide; acetoacetoxyethyl methacrylate; acetoacetoxyethyl methacrylate enamine; the ethylenically unsaturated sulfonic acid-containing monomers and salts thereof or the ethylenically unsaturated phosphorous acid-containing monomers and salts thereof described above in preparing the polymeric dispersant such as sodium p-styrene sulfonate; 2-acrylamido-2-methylpropane sulfonic acid or a salt thereof; and phosphoethyl methacrylate or a salt thereof; or combinations thereof. The concentration of anti-agglomerating functional groups in the acrylic polymer particles may be 0.5% or higher or 1% or higher, and at the same time, 10% or lower or 5% or lower, by weight based on the weight of the acrylic polymer. The acrylic polymer in the epoxy imbibed latex may further include structural units of one or more α,β-ethylenically unsaturated carboxylic acid monomers as described above in the polymeric dispersant, such as acrylic acid, methacrylic acid, and itaconic acid, in an amount of from 0.1% to 5% or up to 20% by weight, based on the weight of the acrylic polymer.

The acrylic polymer in the epoxy imbibed latex may further include structural units of one or more multi-ethylenically unsaturated monomers such as allyl (meth)acrylate; diallyl phthalate; 1,4-butylene glycol di(meth)acrylate; 1,2-ethylene glycol di(meth)acrylate; 1,6-hexanediol di(meth)acrylate; divinyl benzene; or mixtures thereof. Moreover, one or more ethylenically unsaturated nonionic monomers as described above in the polymeric dispersant section may be also included to form structural units of the acrylic polymer. The acrylic polymer particles may be prepared according to the same process for preparing the polymeric dispersant.

The epoxy imbibed latex useful in the present invention is advantageously prepared as disclosed in US2012/0301621A, e.g., separately from the acrylic polymer dispersion using conventional polymerization techniques (e.g., as described above for preparing the polymeric dispersant), then combined with the epoxy compound. The epoxy compound can be neat or in the form of an aqueous dispersion, preferably as an aqueous dispersion, and more preferably as a micronized aqueous dispersion. When the epoxy compound is added as an aqueous dispersion, the dispersion of the epoxy compound is stabilized with a stabilizing amount of a surfactant, preferably at a concentration in the range of 0.5% to 5% by weight. Nonionic surfactants are preferred, including alkyl phenol ethoxylate (APEO) free, non-ionic wetting agents such as polyalkylene oxide block copolymers, polyoxyethyleneglycol alkyl ethers, glucoside alkyl ethers, fatty acid esters, glycerol alkyl esters, sorbitan alkyl esters, and polyoxyethylene glycol alkylphenol ethers, including commercially available wetting agents such as TRITON™ X-405 octylphenol ethoxylate available from The Dow Chemical Company. When the epoxy compound combined with the acrylic polymer dispersion as a neat compound, imbibing is facilitated by agitation at or above room temperature. The weight average particle size of the epoxy imbibed latex is typically in the range of from 150 to 350 nm. Weight average particle size is determined using light scattering.

The epoxy imbibed latex useful in the present invention may have a high solids content, that is, latexes with solids content of at least 40% and particularly in the range of 45-60%, by weight based on the total weight of the epoxy imbibed latex. These epoxy imbibed latexes can include high levels of the acrylic polymer, typically in the range of from 20% to 60% or from 30% to 50%, by weight based on the total weight of the acrylic polymer and the epoxy compound.

The waterborne epoxy resin in Component A of the epoxy coating composition may be present, by dry weight based on the total dry weight of Component A, in an amount of 5% or more, 10% or more, 15% or more, or even 20% or more, and at the same time, 80% or less, 70% or less, 65% or less, or even 60% or less.

Component A of the epoxy coating composition of the present invention further comprises pigments and/or extenders. "Pigment" herein refers to a particulate inorganic material which is capable of materially contributing to the opacity or hiding capability of a coating. Such materials typically have a refractive index greater than 1.8. Inorganic pigments may include, for example, titanium dioxide ($TiO_2$), zinc oxide, iron oxide, zinc sulfide, barium sulfate, barium carbonate, or mixture thereof. Preferred pigment is $TiO_2$. $TiO_2$ typically exists in two crystal forms, anastase and rutile. $TiO_2$ may be also available in concentrated dispersion form. Component A of the epoxy coating composition may also comprise one or more extenders. "Extender" herein refers to a particulate inorganic material having a refractive index of less than or equal to 1.8 and greater than 1.3. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof.

The epoxy coating composition of the present invention further comprises Component B. Component B includes curing agents such as amine curing agents to cure the epoxy coating composition. Examples of suitable curing agents include diethylenetriamine, triethylenetetramine, tetraethylene-pentamine, 2,2,4-trimethylhexamethylenediamine, 2,4,4-trimethylhexamethylenediamine, 1,6-hexanediamine, 1-ethyl-1,3-propanediamine, bis(3-aminopropyl)piperazine, N-aminoethylpiperazine, N,N-bis(3-aminopropyl)ethylenediamine, 2,4-toluenediamine, 2,6-toluenediamine, 1,2-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophorone-diamine, norboranediamine, 4,4'-diaminodicyclohexylmethane, 4,4'-diaminodicyclohexylmethane, 4,4'-diaminodicyclohexyl-propane, 2,2-bis(4-aminocyclohexyl) propane, 3,3'-dimethyl-4,4'-diaminodicyclohexylmethane, 3-amino-1-cyclohexane-amino-propane, 1,3- and 1,4-bis (aminomethyl)cyclohexane, m-xylylenediamine, p-xylylenediamine, polyoxypropylenediamines, polyamidoamines and aminoplast resins formed by the reaction of ureas and melamines with aldehydes. Commercially available curing agents include Epi-cure 8535, 8536, 8537, 8290 and 8292 curing agents available from Hexion; Anquamine 401 and Epilink 381 curing agents available from Air Products; Beckopox EH659W, EH623W and VEH2133W curing agents available from Allnex; and Epotuf 37-680 and 37-681 curing agents available from Reichhold.

Component A and/or Component B can optionally include other ingredients such as water, a coalescent, a defoamer, a wetting agent, a thickener, or mixtures thereof.

"Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The concentration of the defoamer may be, by weight based on the total dry weight of the epoxy coating composition, generally from zero to 2%, from 0.02% to 0.5%, or from 0.04% to 0.2%.

The thickeners useful in the present invention may include associative thickeners such as hydrophobically modified ethoxylated urethanes (HEUR). The concentration of the thickener may be, by weight based on the total dry weight of the epoxy coating composition, generally from zero to 10% by weight, from 0.1% to 4%, or from 0.5% to 2%.

"Wetting agents" herein refer to chemical additives that reduce the surface tension of a coating composition, causing the coating composition to more easily spread across or penetrate the surface of a substrate. Wetting agents may be anionic, zwitterionic, or non-ionic. The concentration of the wetting agent may be, by weight based on the total dry weight of the epoxy coating composition, from zero to 5%, 0.01% to 2%, or from 0.2% to 1%.

"Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. The concentration of the coalescent may be, by weight based on the total dry weight of the epoxy coating composition, from zero to 10%, from 0.01% to 9%, or from 1% to 8%.

In addition to the components described above, the epoxy coating composition of the present invention may further comprise any one or combination of the following additives: buffers, neutralizers, humectants, mildewcides, biocides, anti-skinning agents, colorants, flowing agents, anti-oxidants, plasticizers, leveling agents, adhesion promoters, and grind vehicles. When present, these additives may be present in a combined amount of from zero to 10%, from 0.01% to 2%, or from 0.05% to 1%, by weight based on the total weight of the epoxy coating composition.

Component A and Component B are mixed together to form the epoxy coating composition prior to application. The amount of the curing agent used generally varies from about 1:0.75 to 1:1.5 and preferably from 1:1 to 1:1.4, active hydrogen equivalent to oxirane equivalent of the waterborne epoxy resin. The weight ratio of Component A to Component B in the epoxy coating composition may be from 90:1 to 1:1, from 40:1 to 2:1, from 25:1 to 4:1, or from 15:1 to 5:1, affording flexibility in operation.

The epoxy coating composition of the present invention may have a pigment volume concentration (PVC) of from 5% to 90%, for example, 10% or more, 15% or more, 20% or more, or even 25% or more, at the same time, 85% or less, 80% or less, 70% or less, 60% or less, 50% or less, 40% or less, 35% or less, or even 30% or less. PVC may be determined according to the following equation:

$$\text{PVC \%} = [\text{Volume}_{(Pigment+Extender)} / \text{Volume}_{(Pigment+Extender+Binder)}] \times 100\%$$

The binder herein includes the waterborne epoxy resin in Component A and the curing agent in Component B.

The solids content of the epoxy coating composition of the present invention may be from 20% to 70% by weight, from 25% to 65% by weight, or from 30% to 50% by weight. The epoxy coating composition of the present invention is substantially free of the polyfunctional carboxylic hydrazides described above, for example, in an amount less than 0.5%, less than 0.1%, or even zero, by weight based on the dry weight of the polymeric dispersant.

The epoxy coating composition of the present invention may be prepared by admixing Component A and Component B as described above. The pigments and/or extenders are preferably mixed with the polymeric dispersant to form a slurry of the pigments and/or extenders. The obtained admixture may be then subjected to shearing in a grinding or milling device as is well known in the pigment dispersion art. Such grinding or milling devices include roller mills, ball mills, bead mills, attrittor mills and include mills in which the admixture is continuously recirculated. The shearing of the admixture is continued for a time sufficient to disperse the pigments and/or extenders. The waterborne epoxy resin and other ingredients are added to the pigment and/or extender grinds under low speed stirring to form Component A.

The epoxy coating composition of the present invention provides coatings made therefrom with improved salt spray corrosion resistance. For example, the epoxy coating composition exhibits a blister rating better than "2MD" at a dry film thickness of 50-60 μm after at least 110 hours, or even 175 hours, of exposure to salt spray when coated onto a corrosion susceptible substrate, such as cold rolled steel. The coating composition may also have good stability, for example, good storage stability as indicated by a viscosity change of 10 Krebs Units (KU) or less for Component A after storage. The salt spray and storage stability tests may be conducted according to the test methods described in the Examples section below.

The present invention also relates to a method of improving corrosion resistance of a coating. The method may comprise (i) providing the epoxy coating composition of the present invention, (ii) applying the epoxy coating composition to a substrate; and (iii) drying, or allowing to dry, the epoxy coating composition to obtain the coating, wherein the coating has an improved corrosion resistance as defined above. The epoxy coating composition can be applied to, and adhered to, various substrates. Examples of suitable substrates include wood, metals, plastics, foams, stones, elastomeric substrates, glass, fabrics, concrete, or cementitious substrates. The epoxy coating composition is suitable for various applications such as marine and protective coatings, automotive coatings, traffic paint, Exterior Insulation and Finish Systems (EIFS), roof mastic, wood coatings, coil coatings, plastic coatings, can coatings, architectural coatings, and civil engineering coatings. The epoxy coating composition is particularly suitable for industrial coatings.

The epoxy coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the epoxy coating composition of the present invention has been applied to a substrate, the epoxy coating composition can dry, or allow to dry, to form a film (this is, coating) at room temperature (20-25° C.), or at an elevated temperature, for example, from 35 to 60° C.

EXAMPLES

Some embodiments of the invention will now be described in the following Examples, wherein all parts and percentages are by weight unless otherwise specified.

The following abbreviations are used in the examples:

ST: Styrene, MMA: Methyl methacrylate, PEM: Phosphoethyl methacrylate, SPS: Sodium persulfate, t-BHP: tert-Butyl hydroperoxide, IAA: isoascorbic acid, DAAM: Diacetone acrylamide, SHP: sodium hyphophosphite, nDDM: n-Dodecyl mercaptan, AMPS 2405: 50% aqueous solution of sodium salt of 2-acrylamido-2-methylpropane sulfonic acid (AMPS) from Lubrizol, and MA-80A: methacrylic ester of methoxypolyethylene glycol (8 ethylene oxide units) available from Nippon Nyukazai).

The following standard analytical equipment and methods are used in the Examples.

Storage Stability

A Stormer viscometer was used to analyze the medium shear viscosity (KU as units) of Component A (epoxy side) of a coating composition according to ASTM (American Society for Testing and Materials) D562-10(2014). In a 500 mL container, the Component A (510 grams (g)) was formed at room temperature based on formulations given in Table 2 below, and then an initial viscosity was measured and denoted as Initial $KU^1$. The Component A was then equilibrated at room temperature overnight and then a viscosity overnight was measured and denoted as Final $KU^1$. The overnight viscosity change, denoted as delta KU (overnight), is determined by Final $KU^1$ minus Initial $KU^1$. Then, a portion of the Component A (180 g) was poured into a 200 ml plastic bottle, and then an initial viscosity was measured and denoted as Initial $KU^2$. The plastic bottle was stored in an oven at 50° C. for 7 days, and then allowed to cool to room temperature to test a final viscosity, denoted as Final $KU^2$. The heatage viscosity change, denoted as delta KU (heatage), is determined by Final $KU^2$ minus Initial $KU^2$. Thus, the total viscosity change, denoted as total delta KU, is calculated by the sum of delta KU (overnight) and delta KU (heatage), that is, (Final $KU^1$−Initial $KU^1$)+(Final $KU^2$−Initial $KU^2$). The total delta KU being 10 KU or less indicates acceptable storage stability. The smaller the total delta KU, the better the storage stability.

Salt Spray Test

The surface of cold rolled steel panels were cleaned prior to coating application. Then a coating composition was applied on the cold rolled steel panels by drawdown bar and allowed to dry in a constant temperature room (CTR, 25° C., 50% relative humidity ("RH")) for 7 days prior to testing. The obtained dry coating films had a thickness in the range of 50-60 μm. The coated panels were sealed by 3M tape and a scribe mark made with a razor blade was scratched into the bottom half of the panels immediately before exposure. Salt spray corrosion resistance was tested by exposure of the as prepared panels to a salt spray environment (5% sodium chloride fog) in accordance with ASTM B-117-2011. Panels were exposed to the salt spray environment for 110 hours, and then removed to rate blistering. Blister ratings were conducted in accordance with ASTM D714-02 (2009) and included a number and one or more letters. The letter is a qualitative representation of the density of bubbles, whereby "F" refers to few, "D" refers to dense, "M" refers to medium, "MD" refers to medium dense, and "D" refers to dense. The number refers to the size of the blister, whereby 0 is the largest size, 10 is no blister. The bigger the number, the smaller the size of blister. Blistering ratings better than "2MD" indicate acceptable salt spray corrosion resistance.

GPC Analysis

GPC analysis was performed generally by Agilent 1200. A dispersant sample was dissolved in dimethylformamide (with formic acid, 100:2, v/v) with a concentration of about 5 mg/mL and then filtered through 0.45 μm Polytetra fluoroethylene (PTFE) filter prior to the GPC analysis. The GPC analysis was conducted using the following conditions: Column: One PL guard column (7.5 mm*50 mm, 5 um) and two Mixed E or D columns (7.5×300 mm) in tandem; column temperature: 50° C.; mobile phase: dimethylformamide (with formic acid, 100:2, v/v); flow rate: 0.7 mL/minute; Injection volume: 100 L; detector: Agilent Refractive Index detector, 50° C.; and calibration curve: PL Polyethylene Glycol standards with molecular weights ranging from 31630 to 1010 g/mol, using polynom 3 fitness.

Dispersing Efficiency

The pH of a dispersant was first adjusted to 8.8 by $NH_3 \cdot H_2O$ to give a neutralized dispersant. Water (125 g), $TiO_2$ (Ti-Pure R-902, 37.5 g), an anti-rust pigment (Nubirox 106, 45 g), talc (Talc 800, 75 g), and barium sulfate (Blanc Fixe N $BaSO_4$ 1250, 90 g) were added to a 0.5 L plastic straight cylinder to form a paste. Then the neutralized dispersant obtained above (0.1-0.3 g) was added to the above formed paste. After grinding the paste under 1,500 rpm agitation for about 2 minutes, the resultant slurry was measured for low shear viscosity (Brookfield 4#/60 rpm) with a Brookfield Viscometer (LVDV-II+). The neutralized dispersant was continuously added into the slurry until the viscosity of the slurry didn't drop. The dispersing efficiency was recorded as percentage of the dry weight of the dispersant to the dry weight of the total amount of pigments and extenders at the lowest point of the low shear viscosity of the slurry. The lower the percentage, the better the dispersing efficiency.

Synthesis of Polymeric Dispersant 1

Firstly, a monomer aqueous solution was prepared by mixing deionized (DI) water (200 g), MA-80A (154.8 g), PEM (55.2 g) and DAAM (10 g). In a 500 mL reactor with a mechanical stirrer, a condenser, a thermometer and nitrogen ($N_2$) purging line, DI water (200 g) was added. When the reactor temperature was increased up to 88° C., a chain regulator solution of SHP (16.62 g SHP dissolved in 15 g DI water) was added into reactor. After 3 minutes, the monomer aqueous solution, an initiator solution of SPS (16.62 g SPS dissolved in 20 g DI water), and another chain regulator solution of SHP (16.62 g SHP dissolved in 20 g DI water) were gradually fed into the reactor at 78° C. over 85 minutes, 100 minutes, and 85 minutes, respectively. When all feeds were finished, feed pipes were rinsed and the reactor was kept at 88° C. for 15 minutes. Then the reactor temperature was cooled down to room temperature to give an aqueous solution.

Synthesis of Polymeric Dispersant A

The dispersant A was prepared according to the same procedure as preparing the dispersant 1 above, except that the monomer aqeuous solution used herein was prepared by mixing DI water (236.8 g), MA-80A (138 g), and PEM (55.2 g).

Synthesis of Polymeric Dispersant B

Firstly, a monomer emulsion was prepared by mixing STY (225.00 g), AMPS 2405 (90.00 g), PEM (18.00 g), MMA (12.00 g), nDDM (12.87 g), and Disponil Fes 993 surfactant (18.30 g, sodium salt of a fatty polyglycol ether sulphate, available from BASF) in water (70 g). A three-liter, five-necked flask equipped with a mechanical stirrer, $N_2$ sweep, a thermocouple, and a condenser was charged with water (405 g) and Disponil Fes 993 (1.95 g). The resultant solution in the flask was heated to 86° C. An initiator solution of SPS (1.30 g SPS dissolved in 5 g water) was added. Two minutes later, the monomer emulsion was fed. Simultaneously, another initiator solution of SPS (1.06 g SPS dissolved in 60 g water) was co-fed over a period of 90 minutes while the flask temperature was maintained around 86° C., holding for 10 minutes after the end of the feeds. After cooling to 60° C., a chaser system including an aqueous solution of ferrous sulfate (4 g, 0.2%), t-BHP (1.18 g) dissolved in water (5 g), as well as IAA (0.58 g) dissolved in water (5 g) were added. After holding for 15 minutes, the identical chaser system was charged again. Finally the resultant dispersion was cooled to ambient temperature and filtered through 325 mesh size screen to afford a copolymer emulsion with total solids of 30%.

Synthesis of Polymeric Dispersant 2

The dispersant 2 was prepared according to the same procedure as preparing the dispersant B above, except that the monomer emulsion was prepared by mixing STY (180.00 g), AMPS 2405 (90.00 g), PEM (18 g), MMA (12.00 g), DAAM (45.00 g), nDDM (12.87 g), and Disponil Fes 993 (18.30 g) in water (70 g).

Synthesis of Polymeric Dispersant 3

The dispersant 3 was prepared according to the same procedure as preparing the dispersant B above, except that the monomer emulsion was prepared by mixing STY (195.00 g), AMPS 2405 (90.00 g), PEM (18.00 g), MMA (12.00 g), DAAM (30.00 g), nDDM (12.87 g), and Disponil Fes 993 (18.30 g) in water (70 g).

Properties of the above obtained polymeric dispersants are given in Table 1.

TABLE 1

Properties of polymeric dispersants

| Dispersant | Solids, % | pH | Weight average molecular weight, Dalton |
|---|---|---|---|
| Dispersant A | 35.62 | 1.40 | 16321 |
| Dispersant 1 | 33.34 | 1.42 | 6268 |
| Dispersant B | 30.00 | 4.63 | 25321 |
| Dispersant 2 | 30.39 | 1.40 | 11498 |
| Dispersant 3 | 30.29 | 1.50 | 11605 |

Coating Compositions

Two-component (2k) coating compositions of Examples (Exs) 1-3 and Comparative (Comp) Exs A and B were prepared, based on formulations given in Table 2, according to the procedure as follows, Preparation of Component A: Firstly, water, the above obtained dispersant, $NH_3 \cdot H_2O$ neutralizer, Tego 902W defoamer, Tego 1488 defoamer, and Tego Twin 4100 surfactant were mixed, followed by adding Ti-Pure R-902 $TiO_2$, Nubirox 106 Zinc phosphate, Talc 800, and Blanc Fixe N $BaSO_4$ 1250 barium sulfate. The obtained mixture was then ground under 1,500 rpm agitation for about 30 minutes to form grinds. Then, letdown additives including Texanol coalescent, 15% aqueous $NaNO_2$ inhibitor solution, ACRYSOL™ RM-12W thickener, water, as well as AEH-20 dispersion were added to the grinds and further stirred for 30 minutes to form Component A (Total: 509.92 g). The dispersant used in each coating composition is given in Table 3.

Preparation of Component B: Beckopox EH 613W/80WA hardener was diluted with water and stirred for 10 minutes to form Component B.

Before application of a coating composition to a substrate, Component A and Component B were stored separately. Upon application, Component B was added to Component A at stoichiometry ratio (epoxy: amine) of 1.27:1.0 and stirred for about 15 minutes.

TABLE 2

Formulation of 2K Waterborne Acrylic/Epoxy Hybrid Dispersion

| | Supplier | gram |
|---|---|---|
| Component A (epoxy side) | | |
| Grind | | |
| Water | | 47.00 |
| Dispersant as prepared | | 3.78 |
| $NH_3H_2O$ | | 1.00 |
| Tego 902W defoamer | TEGO Company | 0.36 |
| Tego 1488 defoamer | TEGO Company | 0.60 |
| Tego Twin 4100 surfactant | TEGO Company | 0.60 |
| Ti-Pure R-902 titanium dioxide | DuPont Company | 24.42 |
| Nubirox 106 anti-rust pigment | Nubiola | 30.54 |
| Talc 800 | Shandong Huasheng Fine Chemical, China | 48.00 |
| Blanc Fixe N BaSO4 1250 barium sulfate | Sachtleben Chemie Gmbh | 60.00 |
| Let-down | | |
| MAINCOTE AEH-20 acrylic/epoxy hybrid dispersion (50% solids, epoxy equivalent weight: 1000-1300 g/mol) used as a binder | The Dow Chemical Company | 262.08 |
| Texanol coalescent | The Eastman Chemical Company | 3.60 |
| $NaNO_2$ inhibitor solution (15% aqueous) | Sinopharm Chemical Reagent Co., Ltd. | 2.64 |
| ACRYSOL ™ RM-12W nonionic thickener | The Dow Chemical Company | 9.00 |
| Water | | 16.30 |
| Total | | 509.92 |
| Component B (hardener side) | | |
| Water | | 12.00 |
| Beckopox EH 613W/80WA amine hardener with an H-equivalent weight of 145 g/mol | Allnex | 28.6 |

ACRYSOL is a trademark of The Dow Chemical Company.

The above obtained coating compositions were evaluated according to the test methods described above and results are given in Table 3. As shown in Table 3, comparative dispersants A and B had poor storage stability while all coating formulations formulated with dispersants 1-3 demonstrated acceptable storage stability, as indicated by total delta KU being 10 or less for the Component A of the coating compositions. In addition, dispersants 1-3 provided coatings made therefrom with better salt spray corrosion resistance than the dispersants A and B (a blister rating of 2MD) after exposure to salt spray test for 110 hours or 175 hours. Moreover, dispersants A and B showed lower dispersing efficiency than dispersant 1, and dispersants 2 and 3, respectively.

TABLE 3

Properties of Coating Compositions

| Coating Composition | Comp Ex A | Ex 1 | Ex 2 | Ex 3 | Comp Ex B |
|---|---|---|---|---|---|
| | Dispersant | | | | |
| Dispersant type | Dispersant A | Dispersant 1 | Dispersant 2 | Dispersant 3 | Dispersant B |
| Dispersing efficiency, % | 0.535 | 0.481 | 0.760 | 0.889 | 1.482 |
| | Paint performance after mixing Component A and Component B | | | | |
| Salt spray resistance (100 hours) | 2MD | 4F | 2M | 2F | 2MD |
| Salt spray resistance (175 hours) | | | 2M | 2M | 2MD |
| | Component A Storage Stability | | | | |
| Delta KU (overnight) | 12.2 | 7.9 | 2.6 | 1 | 3.1 |
| Delta KU (heatage) | 5.6 | −2.0 | 5.2 | 3.5 | 7.1 |
| Total Delta KU | 17.8 | 5.9 | 7.8 | 4.5 | 10.2 |

What is claimed is:

1. A two-component epoxy coating composition comprising: an epoxy component A and a component B comprising a curing agent, wherein the epoxy component A comprises
   (i) a waterborne epoxy resin,
   (ii) a polymeric dispersant comprising, by weight based on the dry weight of the polymeric dispersant,
      (a) from 11% to 60% of structural units of an acid monomer and/or a salt thereof selected from the group consisting of an ethylenically unsaturated sulfonic acid-containing monomer or a salt thereof, an ethylenically unsaturated phosphorous acid-containing monomer or a salt thereof, or mixtures thereof;
      (b) from 0.5% to 20% of structural units of a carbonyl-containing functional monomer which is diacetone acrylamide; and
      (c) from 20% to 88.5% of structural units of an ethylenically unsaturated nonionic monomer;
      wherein the polymeric dispersant has a weight average molecular weight of from 300 to 40,000 Daltons, and
   (iii) pigments and/or extenders
   wherein the coating composition is characterized that when applied to a corrosion susceptible substrate at a dry film thickness of 50-60 µm it forms a coating having a blister rating better than "2MD" after at least 110 hours of exposure to salt spray.

2. The epoxy coating composition of claim 1, wherein the polymeric dispersant is present, by dry weight based on the total dry weight of pigments and/or extenders, in an amount of from 0.1% to 10%.

3. The epoxy coating composition of claim 1, wherein the waterborne epoxy resin is an aqueous dispersion of acrylic polymer particles imbibed with an epoxy compound.

4. The epoxy coating composition of claim 1, wherein the weight ratio of the epoxy component A and the component B is from 90:1 to 1:1.

5. A method of preparing a two-component epoxy coating composition of claim 1, comprising: admixing the epoxy component A and the component B comprising the curing agent.

6. The epoxy coating composition of claim 1 wherein the polymeric dispersant comprises 0 to less than 2% of structural units of an additional α,β-ethylenically unsaturated carboxylic acid monomer, by weight based on the dry weight of the polymeric dispersant.

7. The epoxy coating composition of claim 1, wherein the polymeric dispersant comprises, by weight based on the dry weight of the polymeric dispersant, from 4% to 15% of structural units of the carbonyl-containing functional monomer.

8. The epoxy coating composition of claim 1 wherein the polymeric dispersant comprises, by weight based on the dry weight of the polymeric dispersant, from 15% to 35% of structural units of the acid monomer and/or the salt thereof.

9. The epoxy coating composition of claim 1, wherein the weight ratio of the structural unit of the ethylenically unsaturated sulfonic acid-containing monomer and/or salt thereof to the structural unit of the ethylenically unsaturated phosphorous acid-containing monomer and/or salt thereof is in the range of from 0.3 to 20.

10. The epoxy coating composition of claim 1, wherein the acid monomer and/or the salt thereof is selected from the group consisting of phosphoethyl (meth)acrylate, phosphopropyl (meth)acrylate, phosphobutyl (meth)acrylate, salts thereof; sodium styrene sulfonate, sodium vinyl sulfonate, acrylamido-2-methylpropanesulfonic acid, a salt of acrylamido-2-methylpropanesulfonic acid, sodium 2-acrylamido-2-methylpropane sulfonate; or mixtures thereof.

11. The epoxy coating composition of claim 1 wherein the polymeric dispersant comprises, by weight based on the dry weight of the polymeric dispersant,
   from 5% to 20% of structural units of the ethylenically unsaturated sulfonic acid-containing monomer and/or salt thereof, and
   from 4% to 20% of structural units of the ethylenically unsaturated phosphorous acid-containing monomer and/or salt thereof, provided the combined amount of the ethylenically unsaturated sulfonic acid-containing monomer and/or salt thereof and the ethylenically unsaturated phosphorous acid-containing monomer and/or salt thereof is at least 11%,
   from 4% to 15% of structural units of diacetone acrylamide, and
   from 55% to 85% of structural units of the ethylenically unsaturated nonionic monomer.

12. The epoxy coating composition of claim 1 wherein the polymeric dispersant comprises, by weight based on the dry weight of the polymeric dispersant,
   from 15% to 60% of structural units of the ethylenically unsaturated phosphorous acid-containing monomer and/or salt thereof,
   from 2% to 15% of structural units of diacetone acrylamide, and
   from 25% to 80% of structural units of the ethylenically unsaturated nonionic monomer which is an alkoxylated (meth)acrylate.

13. The epoxy coating composition of claim 1 wherein the polymeric dispersant has a weight average molecular weight of from 1,000 to 20,000 Daltons.

* * * * *